INVENTOR.
JAMES LYON
BY
Knox & Knox

June 17, 1969  J LYON  3,450,137
BEAK TRIMMER AND CAUTERIZING MACHINE HAVING PLURAL
ADJUSTABLE BEAK-HOLDING ELEMENTS
Filed March 27, 1967
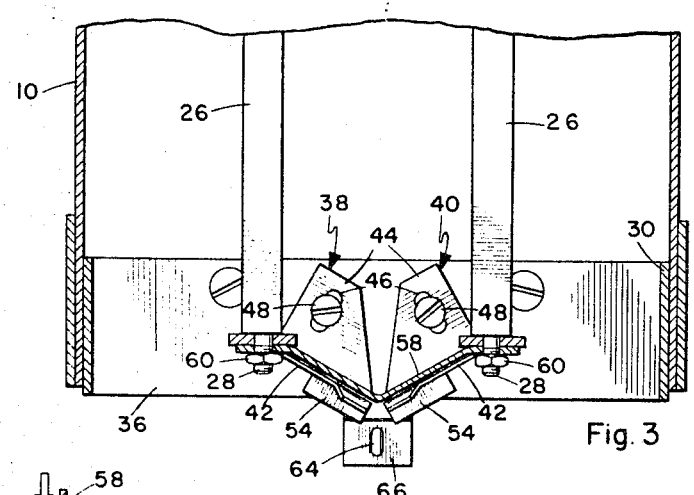
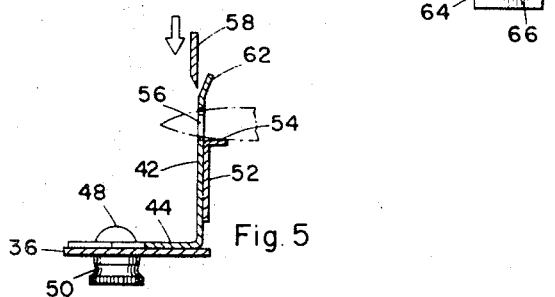
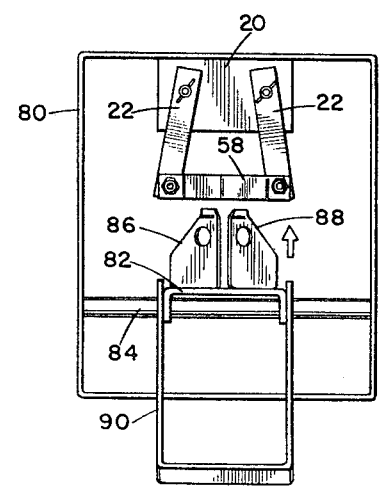
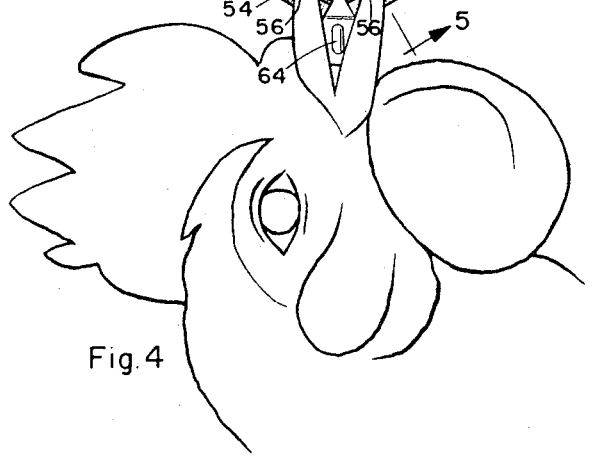
INVENTOR.
JAMES LYON
BY
Knox & Knox

United States Patent Office 3,450,137
Patented June 17, 1969

3,450,137
BEAK TRIMMER AND CAUTERIZING MACHINE HAVING PLURAL ADJUSTABLE BEAK-HOLDING ELEMENTS
James Lyon, 2922 Qualtrough, San Diego, Calif. 92106
Filed Mar. 27, 1967, Ser. No. 626,227
Int. Cl. A61b 17/36
U.S. Cl. 128—303.1                5 Claims

ABSTRACT OF THE DISCLOSURE

The unit is used for trimming the beaks of chickens and other such birds and utilizes gauge elements which hold and support the beak mandibles at the proper position and angle for cutting both mandibles simultaneously by a slicing action with a heated cauterizing blade, the gauge elements being adjustable to accommodate different sizes of beaks and, for any adjusted setting, the diametric dimension, rather than the length of the beak mandibles, is controlling, making trimming uniform and consistent for large numbers of birds.

Background of the invention

The present invention relates to farm equipment and specifically to a beak trimmer for chickens and the like.

It is common practice to cut the beaks of chickens and other such birds to prevent cannibalism, feather picking and other nervous habits of birds in a flock. The usual technique involves a heated blade which cauterizes the cut beak and is made with the beak supported on some type of an anvil, which can dull the hot blade. Normally the beak mandibles are trimmed by inwardly inclined cuts forming a V-shaped notch, so that the sharp beak end is removed and the bird cannot grip effectively with the extreme tip of the beak. The upper and lower mandibles are often cut separately and gauged visually, which is not satisfactory, particularly when treating a large number of birds. End stops which locate the beak in relation to its length are not desirable since the beak length can vary considerably among birds of the same age and type.

Summary of the invention

The beak trimmer described herein utilizes a pair of gauge elements having openings through which the beak mandibles are inserted, the size of the openings determining the depth of insertion according to the diameter of the beak, which is more consistent than the length. The gauge elements are adjustable to set the required angle of cut, and support the beak for cutting by shearing action of a heated blade which is shaped to conform to the disposition of the gauge elements. A beak locator and separator adjacent the gauge elements also serves as a water cooled tongue protector for the bird. The structure is fully adaptable to existing beak trimming machines, such as that manufactured by Lyon Rural Electric Co. of San Diego, Calif., and identified by the trademark Debeaker.

Brief description of the drawings

FIGURE 3 is a sectional view taken on line 3—3 of FIGURE 2;

FIGURE 4 is a sectional view taken on line 4—4 of FIGURE 2;

FIGURE 5 is a sectional view taken on line 5—5 of FIGURE 4; and

FIGURE 6 is an end elevation view, on a reduced scale, showing the trimmer structure on another type of machine.

Description of the preferred embodiment

Figure 1:
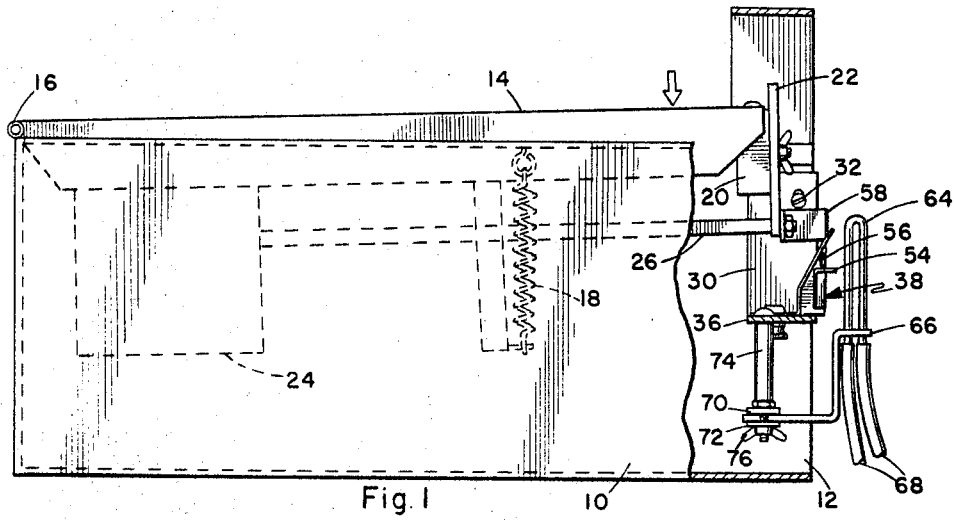
FIGURE 1 is a side elevation view, partially cut away, showing the trimmer structure on a typical beak trimming machine.
Figure 2:
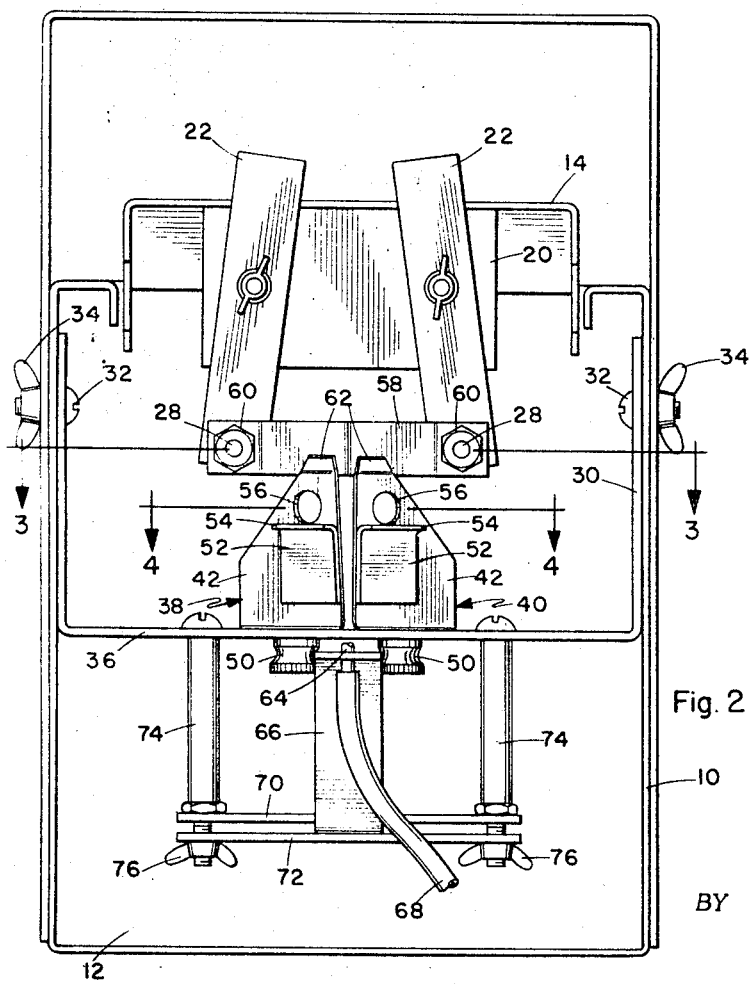
FIGURE 2 is an enlarged end elevation view as taken from the right hand end of FIGURE 1.

The beak trimming machine shown as an example is of the type sold under the "Debeaker" trademark, mentioned above and is shown only in sufficient detail to support the new trimmer structure. Such a machine described in U.S. Patent Nos. 2,359,569 and 2,385,633 and other types in the same line vary in mechanical detail, but the basic principle is well known.

The machine has a rectangular box-like casing 10 open at the front end 12 and provided with a cover member 14 which is attached to the casing at the rear end by a hinge 16. Cover member 14 is supported from casing 10 by spring means 18 and is pressed down against the spring means for the beak cutting action, usually by a foot pedal (not shown) to leave both of the operator's hands free to handle the bird. Under the front end of cover member 14 is an insulated block 20 on which are two downwardly extending, laterally spaced support arms 22. Mounted on cover member 14 is a transformer 24, or similar power supply means, from which heavy bus bars 26 extend to the support arms 22 and have threaded studs 28 projecting through the support arms. Thus far the structure described is conventional and may very in detail.

In the open front end 12 of the casing is a generally U-shaped bracket 30 secured to the casing by screws 32 and wing nuts 34 and being adjustable from front to rear. Bracket 30 has a cross bar 36 on top of which are mounted a pair of gauge elements 38 and 40, similar in all respects but made oppositely, or left and right handed. Each gauge element comprises an upright plate member 42 with a horizontally turned foot plate 44 at the base thereof, the foot plate having an elongated opening 46 for a screw 48, which passes through cross bar 36 and is held by a nut 50. Fixed to the forward face of the plate member 42 is a rest bracket 52 having a forwardly turned lip 54 and, immediately above the lip, the plate member has a gauge hole 56 to receive a beak mandible. The two gauge elements 38 and 40 are angularly disposed relative to each other and to cross bar 36 so that, when the bird's beak mandibles are inserted through the gauge holds 56, as in FIGURE 4, the beak will be jammed and stopped at the required depth of insertion for proper cutting. Usually the plane of each plate member 42 will be from 30 to 45 degrees relative to the adjacent edge of cross bar 36, the position being set for a particular size of bird and left at that setting. This is convenient, since it is customary to trim the beaks of a large flock of birds of similar size in quick succession and one setting will suffice.

Cutting is performed by a blade 58 held between studs 28 and secured by nuts 60, the blade thus completing the electrical circuit between bus bars 26 and being directly heated by its own resistance. The blade 58 is bent in a V-shape to conform closely to the angles of gauge elements 38 and 40, so that the blade slides against the rear faces of said elements with a close shearing action. The upper ends of gauge elements 38 and 40 have forwardly inclined flanges 62 to ensure that the blade will slide down behind the elements without jamming.

To assist in centering the beak and afford protection to the bird's tongue, a guide post 64 is mounted on a bracket 66 immediately forward of the gauge elements. As illustrated the guide post 64 is a folded loop of tubular material, the opposite ends of which are connected by hoses 68 to any suitable source of cold water, so that the post is water cooled to add to the protection for the bird. Bracket 66 is held between clamp bars 70 and 72 supported below cross bar 36 on spacers 74 and secured by wing nuts 76. The guide post 64 is thus fully adjustable to any convenient position to hold the beak in the required alignment for the proper cut. Usually a finger is inserted in the bird's beak for positioning and tongue protection, but this may not be possible on young birds, especially chicks, due to the small beak size. The guide post can be very small in cross section and, since it is adjustable, it is adaptable to all sizes of birds.

In use, the power supply is turned on and the blade 58 heats rapidly, usually to a glowing red. The bird is held with the beak mandibles separated and inserted into the gauge holes 56 as far as possible and resting on the lips 54. In this position the bird can be held securely while the cover member 14 is pulled down, causing the blade to shear cleanly through the beak. The heat of the blade cauterizes the cut area and destroys some of the cell structure, causing the end portions of the beak to sluff off after a short time and leave somewhat rounded ends which cannot be used to injure other birds. The V-shaped cut, which is made consistently by the gauge arrangement, eliminates sharp beak tips and prevents the bird from gripping or pinching in the usual manner, yet does not interfere with normal feeding.

The gauge elements are also adaptable to a machine in which the blade is fixed and the bird's beak is moved to the blade. This arrangement, described in its basic form in U.S. Patent No. 2,742,904, is shown in FIGURE 6 to illustrate the adaptation. The insulated block 20, with the support arms 22 and blade 58, is fixed on the upper portion of casing 80 and connected to the power supply in a suitable manner. Below this is a frame member 82 pivotally mounted on a hinge pin 84 to swing vertically, and on the forward end of the frame member are gauge elements 86 and 88, positioned to pass upwardly over blade 58 with a shearing action. The gauge elements are similar to those described, except that the rest brackets 52 are not required. Instead, a hand rest 90 is secured to the frame member 82, this being conventional and usually having shaped elements thereon for the fingers to ensure accurate positioning. A water cooled guide post may be used if desired and could be readily mounted on frame member 82. The operation is similar to that described above. The bird's beak is inserted into the gauge elements as far as possible, at which position the mandibles will be held at the correct angles and positions. When the frame member 82 is raised, by any conventional means, the beak will be cut off and cauterized.

Other arrangements for obtaining the blade heating and cutting stroke may be equally suitable, but in each instance the gauge elements hold the beak at the correct position and angle and the blade conforms closely to the angles of the gauge elements for a close shearing cut.

It is understood that minor variation from the form of the invention disclosed herein may be made without departure from the spirit and scope of the invention, and that the specification and drawings are to be considered as merely illustrative rather than limiting.

I claim:
1. In a beak trimming machine having beak holding means, a heated cutting blade and means to move said beak holding means and said blade relative to each other in a cutting stroke, the improvement in which:
    said beak holding means includes a pair of plate-like gauge elements each having a beak mandible receiving opening of a size to limit the insertion of a mandible therein, said gauge elements being adjustable and angularly disposed relative to each other;
    and said blade being substantially V-shaped to correspond closely to the angularly disposed faces of said gauge elements from which the beak end portions protrude.
2. The structure of claim 1, wherein each of said gauge elements has a beak supporting lip portion adjacent a corresponding edge of a gauge opening.
3. The structure of claim 1, wherein said beak holding means further includes a bracket on which said gauge elements are mounted, said bracket being adjustable relative to said blade for close shearing alignment of the blade and gauge elements.
4. The structure of claim 1 and including a beak separating guide post adjustably mounted on the machine adjecent said gauge elements on the side thereof remote from said blade.
5. The structure of claim 4, wherein said guide post is hollow for passage of fluid coolant through the post.

References Cited

UNITED STATES PATENTS

| | | | |
|---|---|---|---|
| 2,359,569 | 10/1944 | Lyon | 128—303.1 |
| 2,385,633 | 9/1945 | Lyon | 128—303.1 |
| 2,493,790 | 1/1950 | Walczak | 128—303.1 |
| 2,742,904 | 4/1956 | Lyon | 128—303.1 |
| 2,886,037 | 5/1959 | Lochmiller | 128—305 |
| 3,390,679 | 7/1968 | Turner | 128—303.1 |

RICHARD A. GAUDET, *Primary Examiner.*

RONALD L. FRINKS, *Assistant Examiner.*

U.S. Cl. X.R.

128—305